Nov. 21, 1950     L. A. HENDRICKSON     2,530,879
DEVICE FOR BINDING CABLES ONTO LOADS OF MATERIAL
Filed Sept. 20, 1949

INVENTOR.
Lauri A. Hendrickson
BY Victor J. Evans & Co.
ATTORNEYS

Patented Nov. 21, 1950

2,530,879

UNITED STATES PATENT OFFICE 2,530,879

DEVICE FOR BINDING CABLES ONTO LOADS OF MATERIAL

Lauri A. Hendrickson, Waldoboro, Maine

Application September 20, 1949, Serial No. 116,820

3 Claims. (Cl. 24—68)

This invention relates to a clamp, and more particularly to a clamp for attaching a cable or line around a load of logs, lumber or the like.

The object of the invention is to provide a clamp which is adapted to be used for pulling taut a line or cable that encircles a load of logs or the like, the clamp being provided with a means for securing the cable to the load.

Another object of the invention is to provide a clamp for binding wire ropes onto loads, the clamp including a body member which is adapted to be secured to one end of the wire rope, the clamp further including a locking means for receiving and binding the other end of the wire rope.

A further object of the invention is to provide a clamp which is extremely simple and inexpensive to manufacture.

Other objects and advantages will be apparent during the course of the following description.

In the accompanying drawings, forming a part of this application, and in which like numerals are used to designate like parts throughout the same:

Figure 1:
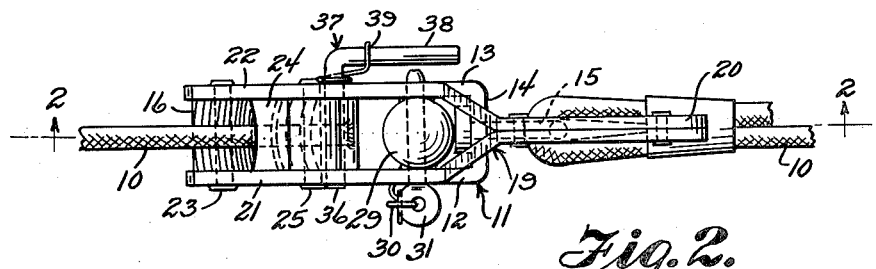
Figure 1 is a top plan view of the clamp, and showing the position of the parts of the clamp when a wire rope is being secured around a load.

Referring in detail to the drawings, the numeral 10 designates a wire rope or cable which is adapted to be encircled about a load of logs, lumber or the like, and the present invention is directed to a clamp for binding the cable 10 onto the load of material.

The clamp of the present invention includes a body member 11 that comprises a pair of spaced parallel legs 12 and 13 that are connected together by a web 14. Connected to the web 14 is an eye bolt 15 and one end of the cable 10 is secured or connected to the eye bolt 15.

Arranged between the legs 12 and 13 of the body member 11 is a semi-cylindrical cam 16, the cam 16 being pivotally connected to the body member 11 by a pin 17. The cam 16 is provided with a plurality of teeth or serrations 18 for a purpose to be later described.

The clamp of the present invention further includes a support member 19 which includes a handle 20 that is adapted to be gripped in the user's hand, the support member 19 comprising a pair of spaced, parallel legs 21 and 22 which embrace an end of the cam 16. A pin 23 pivotally connects the cam 16 to the legs 21 and 22.

Positioned between the legs 21 and 22 is an arcuate cam 24, there being a pin 25 pivotally connecting the cam 24 to the legs 21 and 22. The cam 24 is provided with a plurality of teeth 26 which coact with the teeth 18 to grip a portion of the cable 10 therebetween.

Figure 2:
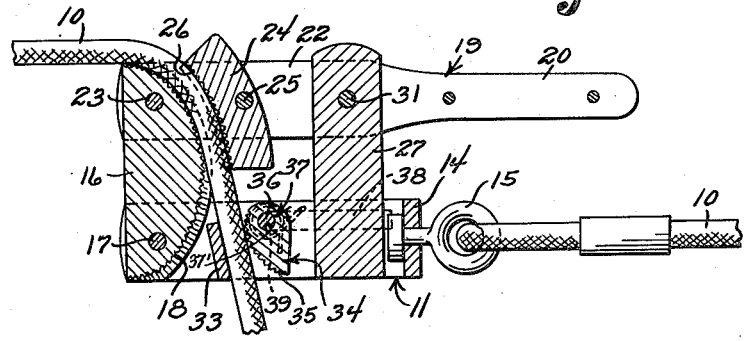
Figure 2 is a sectional view taken on the line 2—2 of Figure 1.
Figure 3:
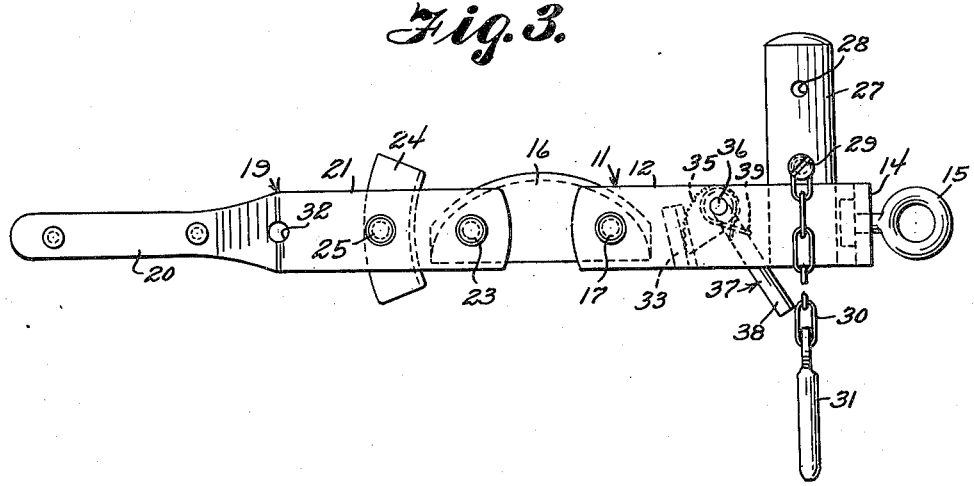
Figure 3 is a side elevational view of the clamp, showing the position of the parts when the clamp is open.

Arranged between the legs 12 and 13 of the body member 11 is a bar 27, the bar 27 being secured to the legs 12 and 13 as by welding. The bar 27 is provided with an opening 28 therein adjacent its outer end. A suitable securing element, such as a screw 29, connects one end of a chain 30 to the bar 27, the other end of the chain 30 being connected to a locking pin 31. The legs 21 and 22 of the support member 19 are each provided with an opening 32 and when the support member 19 is in the position shown in Figure 2, the openings 32 register with the opening 28 in the bar 27 and the locking pin 31 is then inserted through these registering openings to prevent accidental opening of the clamp.

A means is provided for holding the cable 10 during tightening of the cable. This means comprises a cam 34 which is rotatably mounted between the legs 12 and 13 of the body member 11, the cam 34 having a plurality of serrations or teeth 35 thereon. Arranged adjacent the cam 34 is a back plate 33, the back plate 33 being interposed between the legs 12 and 13 and secured thereto as by welding. A key 37', Figure 2, secures the cam 34 to an end 36 of an L-shaped lever 37, the other end 38 of the lever 37 serving as a handle whereby the cam 34 can be pivoted or rotated as desired. A spring 39 is arranged in engagement with the lever 37 for normally urging the cam 34 towards the cable 10 to hold the cable under tension.

In use, one end of the cable 10 is connected to the eye bolt 15 and the cable 10 is encircled about the load of logs, lumber or other material. Then, the other or free end of the cable 10 is inserted in the space between the cam 24 and the cam 16, and the user pushes on the handle 20 to move the support member 19 to the position shown in Figure 2. This causes the teeth 26 on the cam 24 to coact with the teeth 18 on the cam 16 and securely grip therebetween the cable 10. To provide a positive lock or to insure that the clamp will not accidentally open, the locking pin 31 is then inserted through the registering openings 32 and 28 to thereby lock or bind the cable onto the load of material. Further, the free end of the cable 10 is positioned between the cam 34 and the back plate 33 and the spring 39 urges the cam 34 towards the plate 33 so that the cable 10 will be gripped therebetween. Thus, the cable or rope 10 will be held under tension while the clamp is being locked. Also, the cam 34 prevents the cable 10 from accidentally slipping when the user momentarily releases the support member 19.

What I claim:

1. In a clamp for binding a cable around a load of material, a body member, said body member including a pair of spaced parallel legs, and a web connecting said legs together, an eye bolt secured to said web and having one end of the cable connected thereto, a bar having one end positioned between said legs and secured thereto, there being an opening in said bar adjacent the other end thereof, a chain connected to said bar, a locking pin carried by said chain, a semi-cylindrical cam positioned between said legs and pivotally connected thereto at their adjacent ends, there being a plurality of teeth arranged on said cam, a support member pivotally connected to said cam at the other end thereof, a handle projecting from said support member, an arcuate cam pivotally connected to said support member, and having a plurality of teeth thereon, the teeth on said arcuate cam and the teeth on said semi-cylindrical cam serving to grip therebetween the other end of said cable, said support member including a pair of spaced parallel legs adapted to embrace said bar, there being registering openings in said legs of said support member, for registering with the opening in said bar, said registering openings adapted to receive therein said locking pin.

2. The subject matter of claim 1, and further including a back plate arranged between the legs of said body member and secured thereto, a cam provided with teeth arranged adjacent said back plate and pivotally connected to said body member, and a lever for rotating said last named cam.

3. In a clamp for binding a cable around a load of material, a body member, said body member including a pair of legs, and a web connecting said legs together, an eye bolt secured to said web and having one end of the cable connected thereto, a bar positioned between said legs and secured thereto, there being an opening in said bar, a chain connected to said bar, a locking pin carried by said chain, a semicylindrical cam positioned between said legs and pivotally connected thereto at their adjacent ends, there being a plurality of teeth arranged on said cam, a support member pivotally connected to said cam at the other end thereof, a handle projecting from said support member, an arcuate cam pivotally connected to said support member and having a plurality of teeth thereon, the teeth on said arcuate cam and the teeth on said semicylindrical cam serving to grip therebetween the other end of said cable, said support member including a pair of legs adapted to embrace said bar, there being registering openings in said legs of said support member for registering with the opening in said bar, said registering openings adapted to receive therein said locking pin.

LAURI A. HENDRICKSON.

REFERENCES CITED

The following references are of record in the file of this patent:

UNITED STATES PATENTS

| Number | Name | Date |
| --- | --- | --- |
| 1,012,587 | Ballul | Dec. 26, 1911 |